3,430,816
APPARATUS FOR DISPENSING ADHESIVE MATERIALS

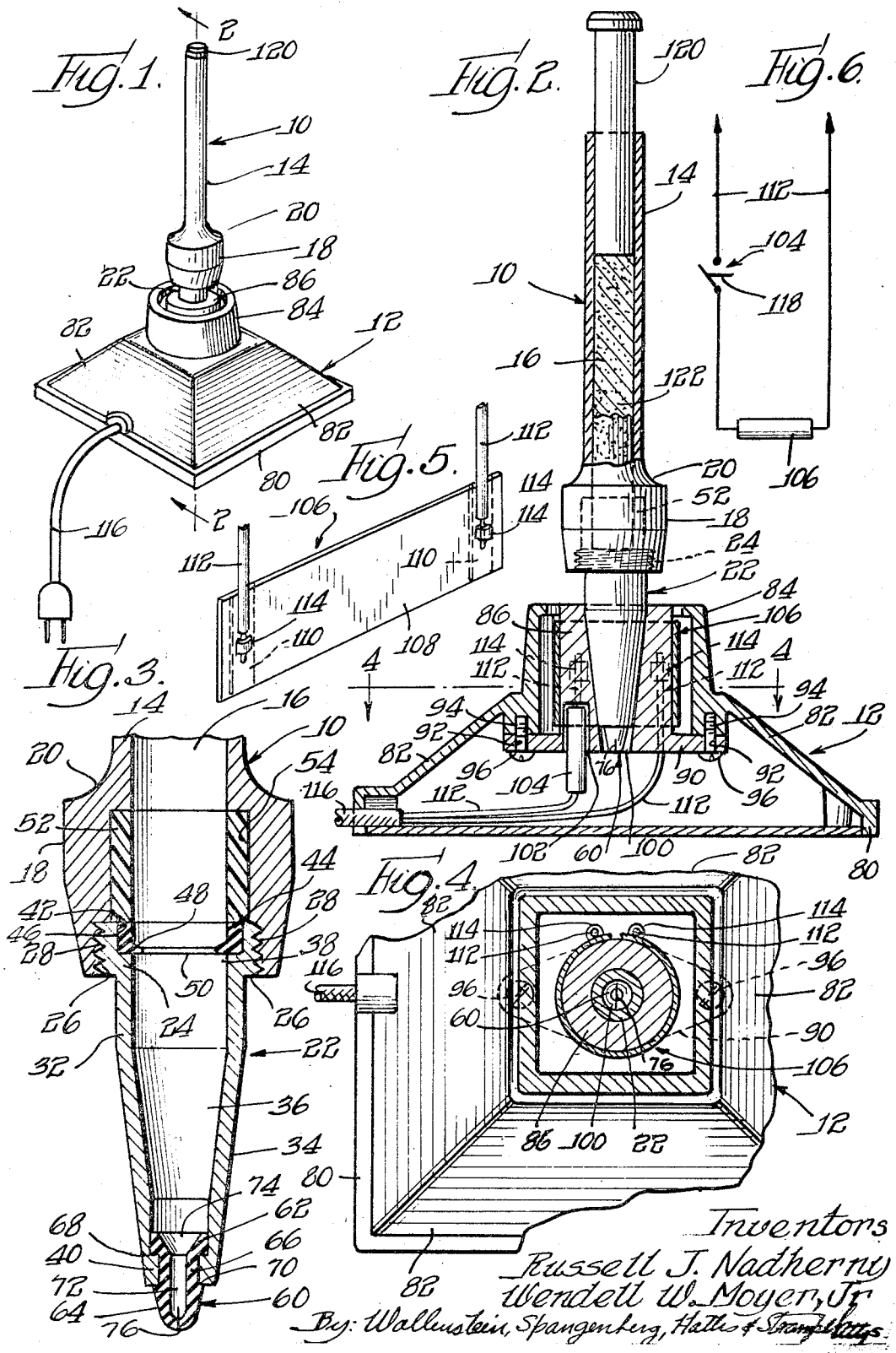

Russell J. Nadherny, Glenview, and Wendell W. Moyer, Jr., Oak Brook, Ill., assignors to Daubert Chemical Company, Oak Brook, Ill., a corporation of Illinois
Filed Aug. 17, 1967, Ser. No. 661,441
U.S. Cl. 222—146   12 Claims
Int. Cl. B67d 5/62

ABSTRACT OF THE DISCLOSURE

Apparatus for converting a solid adhesive material such as a thermoplastic adhesive or cement to a molten state and for dispensing the thermoplastic adhesive or cement in its molten state, comprising a portable applicator member and a normally stationary heating member. The normally stationary heating member has a heat sink which receives a heat conducting portion of the portable applicator member. In the preferred embodiment, the heat sink acts to support the portable applicator member in an upright position when converting solid thermoplastic adhesive or cement to a molten state and when the applicator member is not in use.

---

Hand-held thermoplastic adhesive or cement dispensers are known. Representative of such devices are the so-called "pistol-grip" dispensers. While devices of this type are capable of performing the function for which they are intended, they have a number of disadvantages. Thus, for example, while operating at temperatures, of the order of 400° F., they require substantial periods of time to convert the solid thermoplastic adhesive or cement to a molten state. Once the adhesive or cement is molten, it continues to flow from the discharge passage of such devices even after back pressure on the adhesive or cement has been removed. This condition prevents the user of the device from laying it on an unprotected surface during periods of non-use and, more importantly, represents a hazard to the user in that the hot, molten adhesive or cement can burn the skin if contact is made with it. A further shortcoming of conventional adhesive or cement dispensers of the type here under consideration is that they are provided with an electric cord for connection to a source of electric current. The cord is relatively short in length and thus restricts the use of the device to a limited work area. The cord, in addition, is cumbersome and tends to hamper manipulation of such devices. Apart from the foregoing functional disadvantages, conventional adhesive or cement dispensers, have the further shortcoming in that they cannot be easily disassembled for cleaning and/or repairing by the owner. This factor, coupled with their comparatively high initial cost, detracts from their desirability as a convenience tool for hobbyists and do-it-yourself individuals.

In accordance with the present inventiion, there is provided apparatus for use in connection with thermoplastic adhesives or cements which overcomes the aforementioned disadvantages and shortcomings of conventional hand-held thermoplastic adhesive or cement dispensers. The apparatus of this invention not only operates at lower temperatures than such conventional dispensers but also enables a solid thermoplastic adhesive or cement to be converted to a molten state more quickly. Means are provided for the apparatus to enable the molten adhesive or cement to be dispensed only when desired by the user. The excellent control of adhesive or cement flow thus provided substantially eliminates the danger of injury to the user and damage or marring of work area surfaces which may otherwise result from the molten material. In addition, the apparatus of the present invention enables an operator to apply adhesive or cement to a workpiece, or the like, at a distance substantially removed from the point at which the adhesive or cement was converted to a molten state, and to do so completely free of any encumbrance such as an elcetric cord. Furthermore, the apparatus of this invention can be easily disassembled for cleaning and repairing when needed, and can be manufactured from low cost, readily available materials.

Briefly, in its preferred form, the apparatus of the present invention comprises a portable applicator member for holding a quantity of a thermoplastic adhesive or cement, and a normally stationary heating member for heating a removable heat conducting tip carried by the portable applicator member whereby a portion of the thermoplastic adhesive or cement carried by the applicator member will be converted to a molten state. The heat conducting tip of the applicator has a resilient, rubbery or rubber-like valve or flow control element positioned at the outlet or discharge end thereof to enable flow of molten adhesive or cement from the tip of the applicator member to be positively and precisely controlled by the user as desired, and to prevent flow of the molten adhesive or cement from the tip when the tip is being heated or the applicator member is not in use. The portable applicator member further is provided with back flow prevention means and insulator means to prevent molten adhesive or cement from coming into contact with areas of the applicator member to which it may adhere and thereby "freeze" the thermoplastic adhesive or cement in the applicator member upon cooling. A plunger desirably is provided for the portable applicator member to facilitate the application of pressure on the thermoplastic adhesive or cement during use. The normally stationary heating member of the apparatus has a heat conducting unit or heat sink provided with an opening therein for receiving the heat conducting tip of the portable applicator member. The heat sink desirably employs an electrically resistance element as a source of heat for converting the thermoplastic adhesive or cement to a molten state. The heat sink acts to support the portable applicator member in a substantially upright position both when converting a portion of the thermoplastic adhesive or cement in the applicator member to a molten state and when the applicator member is not in use. Temperature control means are associated with the heat sink to maintain the molten adhesive or cement at temperatures of the order of 230° to 320° F.

The above and other advantages and features of the invention will become apparent upon making reference to the description to follow, the claims and the drawings wherein:

FIG. 1 is a perspective view of an embodiment of the apparatus of the present invention;

FIG. 5 is an enlarged perspective view of an electrical stantially along line 2—2 of FIG. 1;

FIG. 3 is an enlarged fragmentary sectional view of a portion of the portable application member of said embodiment of the apparatus;

FIG. 4 is a fragmentary view partly in section taken substantially along line 4—4 of FIG. 2;

FIG. 5 is an enlarged perspective view of an electrical resistance element used in connection with the normally stationary heating member of said embodiment;

FIG. 6 is a circut diagram of one form of an electrical circuit for use in the embodiment illustrated in FIG. 1.

Referring, now, in greater detail to the drawing, the embodiment of the invention illustrated includes a portable applicator member 10 and a normally stationary heating member 12. The member 10 comprises an elongated, open ended gripping portion 14 which defines a substantially cylindrical chamber 16 for receiving a quantity of a solid thermoplastic adhesive or cement. The gripping portion 14 of the member 10 is enlarged at its lower end 18 to form a finger-engaging shoulder 20. The shoulder 20 provides added leverage for the fingers of an operator and acts to prevent them from coming into contact with heated areas of the applicator member 10 during use. The gripping portion 14 of the member 10 may be fabricated of any suitable non-heat conducting material such as plastic, ceramic, wood, fiberglass, or the like.

Joined to the gripping portion 14 at the lower end 18 thereof is an open ended heat conducting tip 22. In the embodiment of the invention illustrated, the upper end 24 of the tip 22 advantageously is enlarged and is provided with external threads 26 which engage internal threads 28 in the enlarged lower end 18 of the gripping portion 14. The tip 22 has a substantially cylindrical wall portion 32 which is joined at its upper end to the threaded enlarged upper end 24 of the tip and at its lower end to a downwardly tapered wall portion 34. The wall portions 32 and 34 of the tip 22 define a melting chamber 36 having an inlet end 38 of substantially the same diameter as the internal diameter of the cylindrical wall portion 32 and a relatively narrow outlet end 40.

The enlarged upper end 24 of the tip 22 is counterbored to provide an annular recess 42 which receives a sealing ring 44 formed of a heat resistant, rubbery, or rubber like, non-heat conducting material. The sealing ring 44 acts to impede, or prevent, back flow of molten thermoplastic adhesive or cement from the melting chamber 36 into the chamber 16 of the gripping portion 14. To this end, the ring 44, as illustrated, has a substantially cylindrical wall portion 46, to the inner lower margin of which is joined an inwardly extending annular lip or flange 48 defining an opening 50 of lesser diameter than the diameter of the inlet end 38 of the melting chamber 36. It should be understood, of course, that the sealing ring may differ in shape. Thus, for example, it may take the form of a U-ring or a modified O-ring.

In order to prevent any molten thermoplastic adhesive or cement which may, for some reason, seep through the opening 50 defined by the lip or flange 48 of the sealing ring 44 from making contact with the walls of the chamber 16 of the gripping portion 14, a thin, rigid liner or insulator 52 is positioned adjacent the sealing ring 44. The liner or insulator 52 may be fused onto the wall of the chamber 16, or, as illustrated, the enlarged lower end 18 of the gripping portion 14 can be counterbored above the internal threads 28 formed therein to provide an annular recess 54 for receiving the liner or insulator 52. The liner or insulator 52 desirably has an internal diameter substantially the same as the diameter of the chamber 16 to facilitate movement of thermoplastic adhesive or cement through the chamber 16 and into the melting chamber 36. The liner or insulator 52 is formed of a material to which the adhesive or cement either will not adhere, or with which it will form only a weak or easily broken adhesive bond. Exemplary of materials having utility in this connection are fluorocarbon and silicone polymers which have been cured to impart the desired rigidity to them. A particularly suitable material for use in forming the liner or insulator 52 is a high polymer of tetrafluoroethylene sold under the trademark "Teflon" (E. I. du Pont de Nemours & Co.).

Positive and selective control of the flow of molten adhesive or cement from the chamber 36 is attained with the portable applicator member 10 of the apparatus of the present invention by providing the heat conducting tip 22 thereof with a resilient, heat resistant, rubbery or rubber-like valve 60 positioned at the outlet end 40 of the chamber 36. The valve 60, as illustrated, comprises a rectangular base portion 62 and a rounded head portion 64 which are connected by an intermediate, relatively narrow neck portion 66. In the embodiment of the invention shown, the valve 60 is retained in position on the tip 22 by counterboring the tip adjacent the outlet end 40 of the chamber 36 to provide a shoulder 68 against which the base portion 62 of the valve 60 abuts and by enlarging the base of the head portion 64 to provide a shoulder 70 which engages the end of the tip 22 at the outlet end 40 of the chamber 36. The valve 60 is provided with a narrow passage 72 which extends through the neck portion 66 into the head portion 64 thereof. The passage 72 communicates with an enlarged, funnel-shaped opening 74 in the base portion 62 which opening, in turn, communicates with the chamber 36. One, or more, thin, narrow slits 76, which extend to the passage 72, are provided in the head portion 64 of the valve 60. The slits 76 are normally closed and prevent molten adhesive or cement from passing out of the chamber 36. When the head portion 64 of the valve 60, however, is pressed gently against a surface to which it is desired to apply adhesive or cement, the resiliency of the material of which the valve 60 is formed enables the slits 72 to be expanded or enlarged sufficiently to permit molten adhesive or cement to pass from the chamber 36 through the opening 74 and the passage 72 in the valve 60.

As stated hereinabove, the sealing ring 44 and the valve 60 are formed of a resilient, heat resistant rubbery or rubber-like material. Exemplary of heat resistant rubbers or rubber-like materials having utility for the purposes of the present invention are silicone elastomers and fluorocarbon elastomers. Silicone rubber compositions containing a finely divided mineral filler such as silica, and fluorocarbon elastomers, such as the copolymer of hexafluoropropylene and vinylidene fluoride sold under the trademark "Viton A," are especially suitable. Generally speaking, heat resistant rubbery or rubber-like materials of the type contemplated herein should have a hardness of from 20 to 100, usually 60 to 70, durometer (Shore A).

The normally stationary heating member 12 of the apparatus, as illustrated, has a rectangularly shaped base portion 80 and upwardly and inwardly extending trapezoidally shaped walls 82 which impart the appearance of a truncated pyramid to the member 12. Extending upwardly from the upper margins of the walls 82 is a hollow, substantially cylindrically shaped heat sink well 84. The base portion 80 of the member 12, as well as the walls 82 and the well 84, may be fabricated of any suitable non-heat conducting material such as plastic, wood, ceramic, fiberglass, or the like. Positioned substantially centrally of the well 84 is a heat conducting member or heat sink 86. The heat sink 86 has a base plate 90 provided with openings 92—92 which are aligned with tapped openings 94—94 in the wall of the well 84 for receiving screws 96—96 by means of which the heat sink 86 is secured in position. The heat sink 86 has a tapered opening 100 therethrough which extends through the base plate 90 and is adapted to receive the heat conducting tip 22 of the portable applicator member 12. A bore 102, which extends through the base plate 90 into the wall of the heat sink 86, receives a thermostat 104 desirably of the conventional bimetallic type.

In the embodiment of the invention illustrated, heat is applied to the heat sink 86 by means of an electrical resistance element 106. While the element may take various forms such as, for example, a resistance wire coil, it is preferred to employ a laminate 108, as illustrated in FIG. 5, comprised of an electrically resistive film sandwiched between layers of asbestos. The laminate 108 has a flat copper electrode 110 along each edge thereof which uniformly distributes voltage. When energized, current flows between the electrodes 110 through the resistive film, producing an even heat. Resistance elements of this type are sold in roll form under the trademark "Cellotherm" (Chemelex, Inc.). The laminates are available in different resistances. In attaining the objectives of the present invention, it is preferred to use a laminate having a resistance of about 40 to 80, usually about 60 ohms/ square. The heat transfer properties of the laminate are extremely rapid and enables the heat sink 86 to convert a solid thermoplastic adhesive or cement to a molten state in a short time. The laminate is positioned on the outer surface of the heat sink 86 and is maintained thereon by a suitable adhesive. One such adhesive is a silicone adhesive sold under the trademark "RTV" (General Electric Co.). These adhesives can also be used to insulate the element 106. Other resistance elements of the type contemplated for use in connection with the apparatus of this invention are sold under the trademarks "Briskeat" (Briscoe Manufacturing Co.) and "Rama Flex" (Rama Industrial Heater Co.).

As seen in FIG. 5, leads 112—112 are secured to the electrodes 110 of the laminate 108. This may be accomplished by soldering the leads 112—112 on the electrodes 110, or, preferably, by fastening them on by means of clips 114—114. An electric cord 116 is provided for the stationary member 12 for connecting the resistance element 106 to a source of electric current. As shown in the circuit diagram designated FIG. 6, one of the leads 112 is connected directly to the current source (not shown) while the other lead 112 is connected to a normally closed switch 118 comprising the bimetallic element of the thermostat 104. The switch 118 closes and opens, in response to temperature conditions in the heat sink 86, to energize and de-energize the resistance element 106.

The solid thermoplastic adhesive or cement utilized in the apparatus of this invention may be in stick, pellet or granular form. From the standpoint of convenience, it is preferred that it be in the form of cylindrically shaped sticks having a length of 1 to 4 inches. To facilitate movement of the solid thermoplastic adhesive or cement through the chamber 16 and into the melting chamber 36, a plunger 120 advantageously is provided for the apparatus. Pressure may be applied to the plunger 120 by means of one finger, usually the forefinger or thumb, of the operator.

The thermoplastic adhesive or cements employed with the apparatus of this invention can vary widely in properties. The adhesive or cement used, generally speaking, should be solid at normal or room temperatures and should be capable of being converted to a molten state at temperatures ranging from 230° to 320° F. In addition, it should not damage, distort or mar surfaces to which it is applied and should not cool or crystallize too rapidly. Apart from the foregoing, the adhesive or cement, upon cooling, should, of course, have good bonding characteristics.

In utilizing the apparatus, an operator first places one or more sticks 122 of a thermoplastic adhesive or cement in the chamber 16 of the applicator member 10. The tip 22 of the applicator member is then positioned in the opening 100 of the heat sink 86 of the normally stationary heating member 12 which has been connected to a source of electric current by the cord 116. If the applicator member is new and is being used for the first time, pressure should be applied to the adhesive or cement by means of the plunger 120 to move the solid adhesive or cement into the melting chamber 36. Under normal conditions, a sufficient quantity of adhesive or cement will be converted to a molten state in the melting chamber 36 in from 2 to 5 minutes, more or less. The applicator member thereafter is grasped by one hand of the user and moved to the work area. In gripping the applicator member, the user may use whichever position is most comfortable for his hand. Usually the applicator member will be grasped in a manner whereby pressure on the plunger will be exerted by either the index finger or the thumb of the user. In applying molten adhesive or cement to a work surface, the user need only press the head portion 64 of the valve 60 gently against the surface. This will cause the slits 76 to expand, and allow molten adhesive or cement to pass out of the melting chamber 36 through the passages 72 and 74 in the valve 60. While adhesive or cement is being dispensed, pressure is maintained on the solid adhesive or cement in the chamber 16 by means of the plunger 120. A portion of the solid adhesive or cement thus will be kept moving into the melting chamber 36 during use of the applicator member and will facilitate flow of molten adhesive or cement through the passages and slits of the valve 60. This arrangement enables positive and selective control of both the amount and the location of adhesive or cement dispensed by the applicator member. The adhesive or cement can be reheated when necessary by simply placing the tip 22 into the heat sink 86. During periods of non-use, the applicator member can be conveniently supported in the heat sink thereby making it available for use when desired.

What is claimed is:

1. Apparatus for converting a solid thermoplastic adhesive or cement to a molten state and for dispensing the themoplastic adhesive or cement in its molten state, comprising a portable applicator member for holding a quantity of a solid themoplastic adhesive or cement while a portion at least thereof is being converted to a molten state and for dispensing the thermoplastic adhesive or cement when in such a state, and a normally stationary heating member for engaging said portable applicator member and for applying heat to a portion thereof thereby to convert at least a portion of the thermoplastic adhesive or cement in the applicator member to a molten state, said heating member having a heat conducting unit provided with an opening therein for engaging a portion of the applicator member and supporting the applicator member in a substantially upright position both when converting at least a portion of the solid themoplastic adhesive or cement in the applicator member to a molten state and when the applicator member is not in use, said portable applicator member, in use, being unconnected to said normally stationary heating member and freely movable in relation thereto.

2. Apparatus according to claim 1, wherein the normally stationary heating member is provided with temperature control means for controlling the temperature to which the heating conducting unit is heated.

3. Apparatus according to claim 1, wherein the portable applicator member is provided with an enlarged portion to facilitate gripping and manipulation thereof.

4. Apparatus according to claim 1, wherein the portable applicator member is provided with pressure applying means to enable pressure to be exerted on the solid thermoplastic adhesive or cement.

5. Apparatus according to claim 4, wherein the pressure applying means comprises a finger actuated plunger.

6. Apparatus according to claim 1, wherein the heat conducting unit of the normally stationary heating member is provided with a heating element at the surface thereof.

7. Apparatus according to claim 6, wherein the heating element for the heat conducting unit of the normally stationary heating member is an electrically resistive film having electrodes for connection to a source of electric current.

8. Apparatus according to claim 1, wherein the portable applicator member comprises an open ended, elongated, non-heat conducting portion and an open ended heat conducting portion, said non-heat conducting portion defining a compartment for a quantity of a solid thermoplastic adhesive or cement and said heat conducting portion defining a melting chamber for the solid thermoplastic adhesive or cement, and sealing means for the applicator member for impeding movement of molten thermoplastic adhesive or cement into the compartment defined by the non-heat conduction portion.

9. Apparatus according to claim 8, wherein the non-heat conducting portion and the heat conducting portion of the applicator member are threadably engaged with one another.

10. Apparatus according to claim 8, wherein the sealing means comprises a resilient, rubbery or rubber like ring having an annular, inwardly extending portion.

11. Apparatus according to claim 8, wherein the portable applicator unit has rigid, non-heat conducting insulator means provided adjacent the melting chamber defined by the heat conducting portion thereof to substantially prevent adhesion of thermoplastic adhesive or cement to the non-heat conducting portion of the applicator member.

12. Apparatus according to claim 8, wherein the heat conducting portion of the applicator member is provided with valve means to enable molten themoplastic adhesive or cement in the melting chamber to be selectively dispensed therefrom.

References Cited

UNITED STATES PATENTS

| 1,048,255 | 12/1912 | Winkelmiller et al. | 222—490 X |
| 1,767,079 | 6/1930 | Kenyon | 222—146 X |
| 2,272,780 | 2/1942 | Schweyer | 222—146 X |
| 2,324,337 | 7/1943 | Jomsland | 222—146 X |
| 2,937,795 | 5/1960 | Ciliberti | 222—490 |
| 3,011,042 | 11/1961 | Kamborian | 222—146 X |
| 3,161,325 | 12/1964 | Hinkel et al. | 222—494 X |
| 3,228,566 | 1/1966 | Knox | 222—146 |

FOREIGN PATENTS

| 231,306 | 3/1944 | Switzerland. |

WALTER SOBIN, *Primary Examiner.*

U.S. Cl. X.R.

222—387, 490